(12) United States Patent
Schlesinger (10) Patent No.: US 7,467,414 B2
(45) Date of Patent: *Dec. 16, 2008

(54) ENTITLEMENT SECURITY AND CONTROL FOR INFORMATION SYSTEM ENTITLEMENT

(75) Inventor: David Schlesinger, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 733 days.

This patent is subject to a terminal disclaimer.

(21) Appl. No.: 10/390,582

(22) Filed: Mar. 17, 2003

(65) Prior Publication Data

US 2004/0186836 A1 Sep. 23, 2004

(51) Int. Cl.
*G06F 17/30* (2006.01)

(52) U.S. Cl. ............... 726/27; 707/1; 707/2; 707/9; 707/10

(58) Field of Classification Search ............... 726/1–7, 726/26–30, 12, 9, 10; 709/217–219, 225, 709/229, 201; 707/1–10; 705/50, 51; 713/182, 713/185, 193, 150, 155; 380/200–203
See application file for complete search history.

(56) References Cited

U.S. PATENT DOCUMENTS

| | | | | |
|---|---|---|---|---|
| 5,999,978 | A * | 12/1999 | Angal et al. | 709/229 |
| 6,088,451 | A * | 7/2000 | He et al. | 726/8 |
| 6,381,602 | B1 * | 4/2002 | Shoroff et al. | 707/9 |
| 6,651,056 | B2 | 11/2003 | Price et al. | |
| 6,745,332 | B1 * | 6/2004 | Wong et al. | 726/4 |
| 6,938,171 | B1 * | 8/2005 | Isomichi et al. | 726/12 |
| 7,032,026 | B1 * | 4/2006 | Biswas et al. | 709/229 |
| 7,054,923 | B2 * | 5/2006 | Krishnamoorthy | 709/219 |
| 7,231,657 | B2 * | 6/2007 | Honarvar et al. | 726/2 |
| 7,236,976 | B2 * | 6/2007 | Breitenbach et al. | 707/100 |
| 2002/0152212 | A1 * | 10/2002 | Feldman | 707/9 |

(Continued)

FOREIGN PATENT DOCUMENTS

JP 2004188736 7/2004

OTHER PUBLICATIONS

Website: www.netegrity.com, Netegrity Identity and Access Management, 1 page.
Website: www.access-networking.com, Access Network Solutions, 1 page.
Website: www.netegrity.com, Netegrity Identity and Access Management, 1 page, Jul. 2003.
Website: www.access-networking.com, Access Network Solutions, 1 page, Jul. 2003.

*Primary Examiner*—Kimyen Vu
*Assistant Examiner*—Nirav Patel
(74) *Attorney, Agent, or Firm*—Blakely, Sokoloff, Taylor & Zafman LLP (57) ABSTRACT

A system, apparatus, and method are provided for entitlement security and control. According to one embodiment, an entitlement request is received from a downstream access control system seeking entitlement permission on behalf of a user, a group of users, all users associated with the downstream access control system, or on behalf of the downstream access control system as a whole, the entitlement request is matched against entitlement rules and roles that are retrieved from a metadata repository, and the entitlement permission is granted if the entitlement request satisfies the entitlement rules and roles.

17 Claims, 7 Drawing Sheets

U.S. PATENT DOCUMENTS

| | | |
|---|---|---|
| 2002/0188869 A1 | 12/2002 | Patrick |
| 2003/0084021 A1 | 5/2003 | Dweck et al. |
| 2003/0105974 A1* | 6/2003 | Griffin et al. ............... 713/200 |
| 2003/0212654 A1* | 11/2003 | Harper et al. ................. 707/1 |
| 2004/0044895 A1 | 3/2004 | Reasons et al. |
| 2004/0093292 A1 | 5/2004 | Shurygailo et al. |
| 2004/0162905 A1* | 8/2004 | Griffin et al. ............... 709/229 |
| 2004/0230917 A1 | 11/2004 | Bales et al. |
| 2005/0086228 A1 | 4/2005 | Gross et al. |
| 2005/0182941 A1 | 8/2005 | Della-Libera et al. |
| 2005/0216421 A1 | 9/2005 | Barry et al. |
| 2006/0041436 A1 | 2/2006 | Brodie et al. |

\* cited by examiner

ENTITLEMENT SECURITY AND CONTROL FOR INFORMATION SYSTEM ENTITLEMENT

BACKGROUND OF THE INVENTION

1. Field of the Invention

This invention relates to security and control and in particular, to entitlement security and control between systems, using metadata.

2. Description of the Related Art

Many attempts have been made to secure the flow of data between two or more systems. However, methods and apparatus available today require individual users to acquire access to an upstream protected application through an administrator. For example, methods and apparatus available today do not allow for a downstream access control system to gain access to an upstream protected application, and the methods and apparatus available today fail to separate entitlement from access, and primarily rely on the "access" part of a security system. By focusing primarily on the access part of the security system, the methods and apparatus available today do not provide the level or type of security and protection needed against hackers, terminated employees or other such individuals, groups, or organizations. For example, a hacker typically obtains access to a system (by hacking), but may never obtain entitlement. Similarly, for example, a terminated employee may continue to access the company's email despite having been terminated, i.e., not having entitlement permission.

Furthermore, methods and apparatus available today do not have rules, and roles at the entitlement level to filter downstream users and access control systems before they are granted access. Such methods and apparatus do not classify data in terms of security, importance, urgency, confidentiality, government, community and organization rules and regulations, and other such matters, and are manual and rely on the expectation that someone or some group within the company is security-aware and can flawlessly filter people when granting access permissions. Additionally, methods and apparatus available today do not use metadata.

Figure 1:
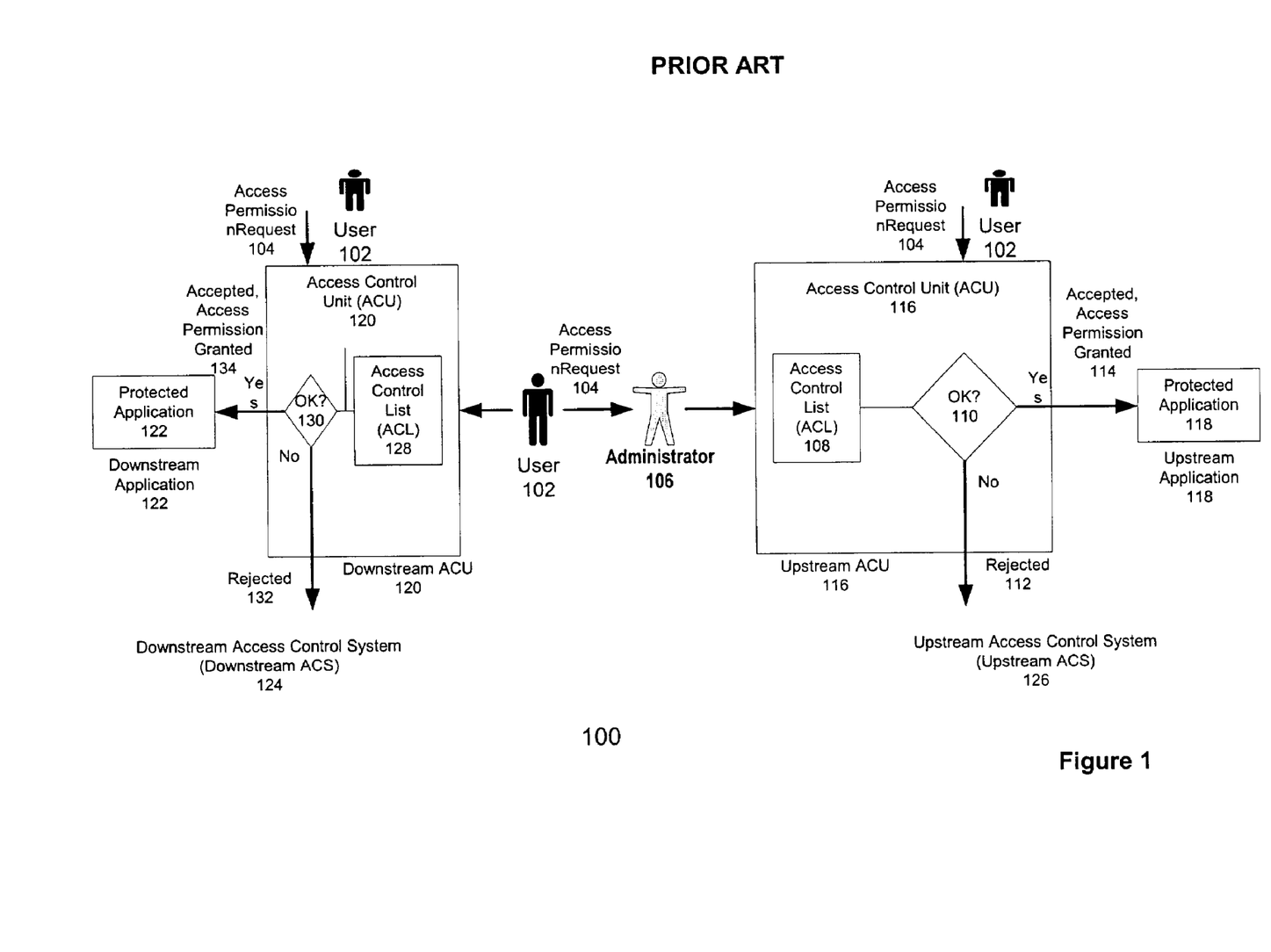
FIG. 1 is a block diagram illustrating a prior art security system.

Typically, as illustrated in FIG. 1, a security control system 100 comprises a downstream ACS 124 and an upstream ACS 126. For a user 102, having existing access to a downstream application 122, to gain access to an upstream application 118, the user 102 would have to place an access request 104 with the upstream ACS 126 through an administrator 106 or the user 102 may be the administrator 106 of the downstream ACS 124. First, the prior art does not provide for the capability where a downstream ACS 124 may request access on behalf of a user, a group of users, or all users, or for the downstream ACS as a whole or itself. Second, the prior art does not require an entitlement request prior to submitting an access request. Furthermore, an administrator 106 is authorized with reviewing the request 104, and the administrator 106 is not likely to have access to many of the rules, regulations, laws, policies, security classifications, and names to make an informed decision, particular when the database is from a different organization. Even if the administrator 106 did have access to such information, it is not likely to be updated, and consequently, ACL 108 is not likely to be content-aware, security-aware, classified, or fully updated, and, is likely to be unable to perform a real-time, fast, informed, and accurate check of access requests 104. Such process only provides for user-based requests, and does not allow for ACS-based requests, and is slow, manual, tedious, labor-intensive, and inaccurate, if various changes are not quickly adopted or known, and is based on out-of-date information.

None of the methods or apparatus available today is entitlement-based, metadata driven, security-aware, or dynamically updated. Methods and apparatus available today do not provide for reviewing of user-based as well as ACS-based requests. Stated differently, methods and apparatus available today do not provide for direct placing and reviewing of entitlement and access requests within a security and control system or between multiple security and control systems.

BRIEF DESCRIPTION OF THE DRAWINGS

The appended claims set forth the features of the present invention with particularity. The embodiments of the present invention, together with its advantages, may be best understood from the following detailed description taken in conjunction with the accompanying drawings of which:

DETAILED DESCRIPTION

A method and apparatus are described for a security and control system (SCS) having an entitlement security and control system (ESCS) with regard to the flow of data between two systems, using metadata. Broadly stated, embodiments of the present invention allow a security and control system to use the metadata driven ESCS to review downstream access control system entitlement requests seeking entitlement permission to ultimately seek access to an upstream protected application, database, or system.

A system, apparatus, and method are provided for reviewing entitlement requests from a downstream access control system (downstream ACS) to access an upstream protected application using real-time entitlement rules and entitlement roles. According to one embodiment the reviewing is metadata-driven. Entitlement rules and entitlement roles may be received from various sources and kept dynamically updated to provide for a real-time review of the entitlement requests. Such information may be tagged with metadata and stored in a metadata repository. Furthermore, according to one embodiment, such information may then be provided to the downstream ACS to update its existing entitlement rules and entitlement roles.

According to one embodiment, a system, apparatus, and method are provided for reviewing entitlement requests from a downstream ACS or user to access an upstream protected application using the existing downstream ACS system entitlement rules and entitlement roles. According to one embodiment the reviewing is metadata-driven.

The embodiments of the present invention may provide a real-time, data-aware, content-sensitive, automated, central, accurate, and up-to-date processing of entitlement permission requests. Typically, entitlement permission precedes access is needed only once, while access permission may be as frequent as the user desires to access a protected system, database, application, or such, or a combination thereof (protected application). According to one embodiment, security classified entitlement rules and roles (ERR) and a metadata repository are also provided and updated for real-time, central, and secure entitlement processing. Many other advantages of the embodiments will be mentioned or discussed here or they will be apparent to one skilled in the art.

In the following description, for the purposes of explanation, numerous specific details are set forth in order to provide a thorough understanding of the present invention. It will be apparent, however, to one skilled in the art that the embodiments of the present invention may be practiced without some of these specific details. In other instances, well-known structures and devices are shown in block diagram form.

The embodiments of the present invention include various steps, which will be described below. The steps may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The embodiments of the present invention may be provided as a computer program product that may include a machine-readable medium, having stored thereon instructions which may be used to program a computer (or other electronic devices) to perform a process according to the present invention. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, a carrier wave or other propagation medium shall be regarded as comprising a machine-readable medium for the purpose of the present specification.

Figure 2:
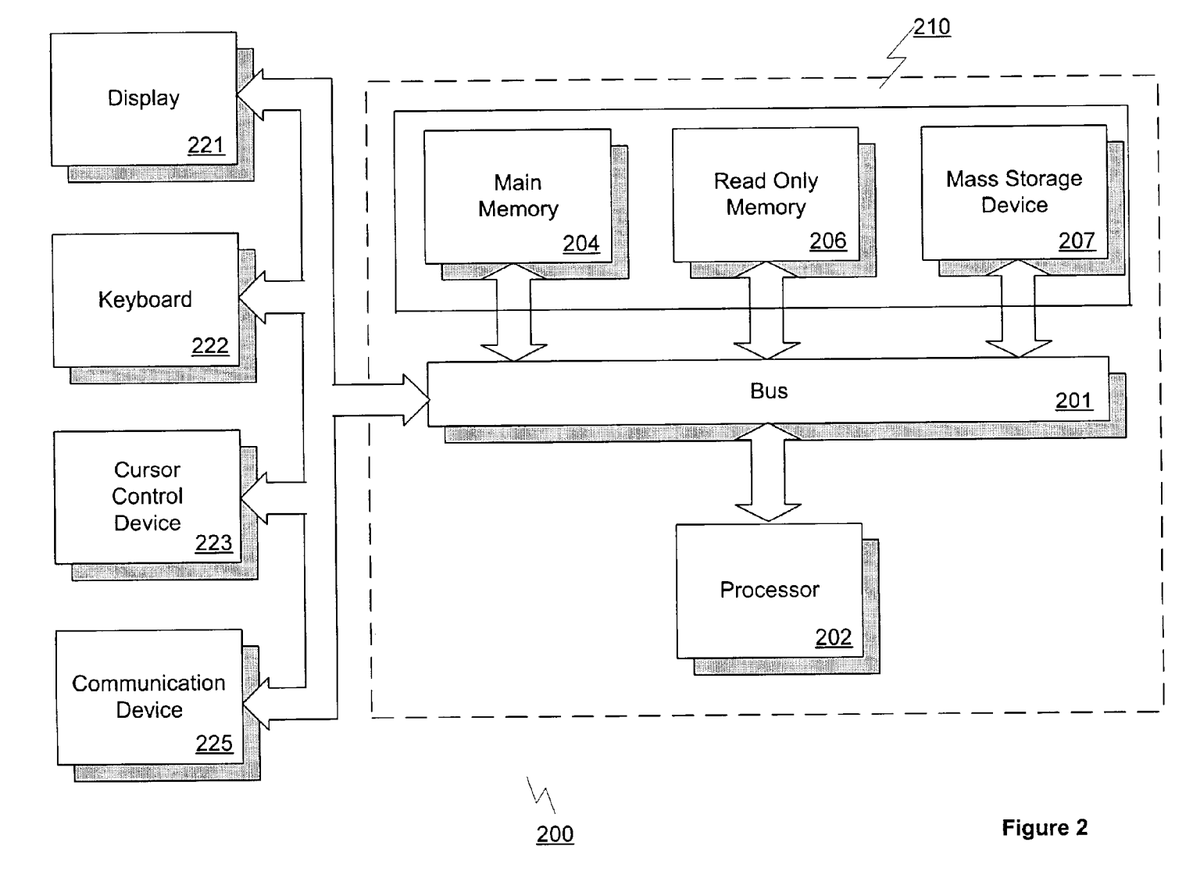
FIG. 2 is a block diagram of a typical computer system upon which one embodiment of the present invention may be implemented.

FIG. 2 is a block diagram of a typical computer system upon which one embodiment of the present invention may be implemented. Computer system 200 comprises a bus or other communication means 201 for communicating information, and a processing means such as processor 202 coupled with bus 201 for processing information. Computer system 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 201 for storing static information and instructions for processor 202.

A data storage device 207 such as a magnetic disk or optical disc and its corresponding drive may also be coupled to computer system 200 for storing information and instructions. Computer system 200 can also be coupled via bus 201 to a display device 221, such as a cathode ray tube (CRT) or Liquid Crystal Display (LCD), for displaying information to an end user. Typically, an alphanumeric input device 222, including alphanumeric and other keys, may be coupled to bus 201 for communicating information and/or command selections to processor 202. Another type of user input device is cursor control 223, such as a mouse, a trackball, or cursor direction keys for communicating direction information and command selections to processor 202 and for controlling cursor movement on display 221.

A communication device 225 is also coupled to bus 201. The communication device 225 may include a modem, a network interface card, or other well-known interface devices, such as those used for coupling to Ethernet, token ring, or other types of physical attachment for purposes of providing a communication link to support a local or wide area network, for example. In this manner, the computer system 200 may be coupled to a number of clients and/or servers via a conventional network infrastructure, such as a company's Intranet and/or the Internet, for example.

It is appreciated that a lesser or more equipped computer system than the example described above may be desirable for certain implementations. Therefore, the configuration of computer system 200 will vary from implementation to implementation depending upon numerous factors, such as price constraints, performance requirements, technological improvements, and/or other circumstances.

It should be noted that, while the steps described herein may be performed under the control of a programmed processor, such as processor 202, in alternative embodiments, the steps may be fully or partially implemented by any programmable or hard-coded logic, such as Field Programmable Gate Arrays (FPGAs), transistor-transistor logic (TTL) logic, or Application Specific Integrated Circuits (ASICs), for example. Additionally, the method of the present invention may be performed by any combination of programmed general-purpose computer components and/or custom hardware components. Therefore, nothing disclosed herein should be construed as limiting the present invention to a particular embodiment wherein the recited steps are performed by a specific combination of hardware components.

Figure 3:
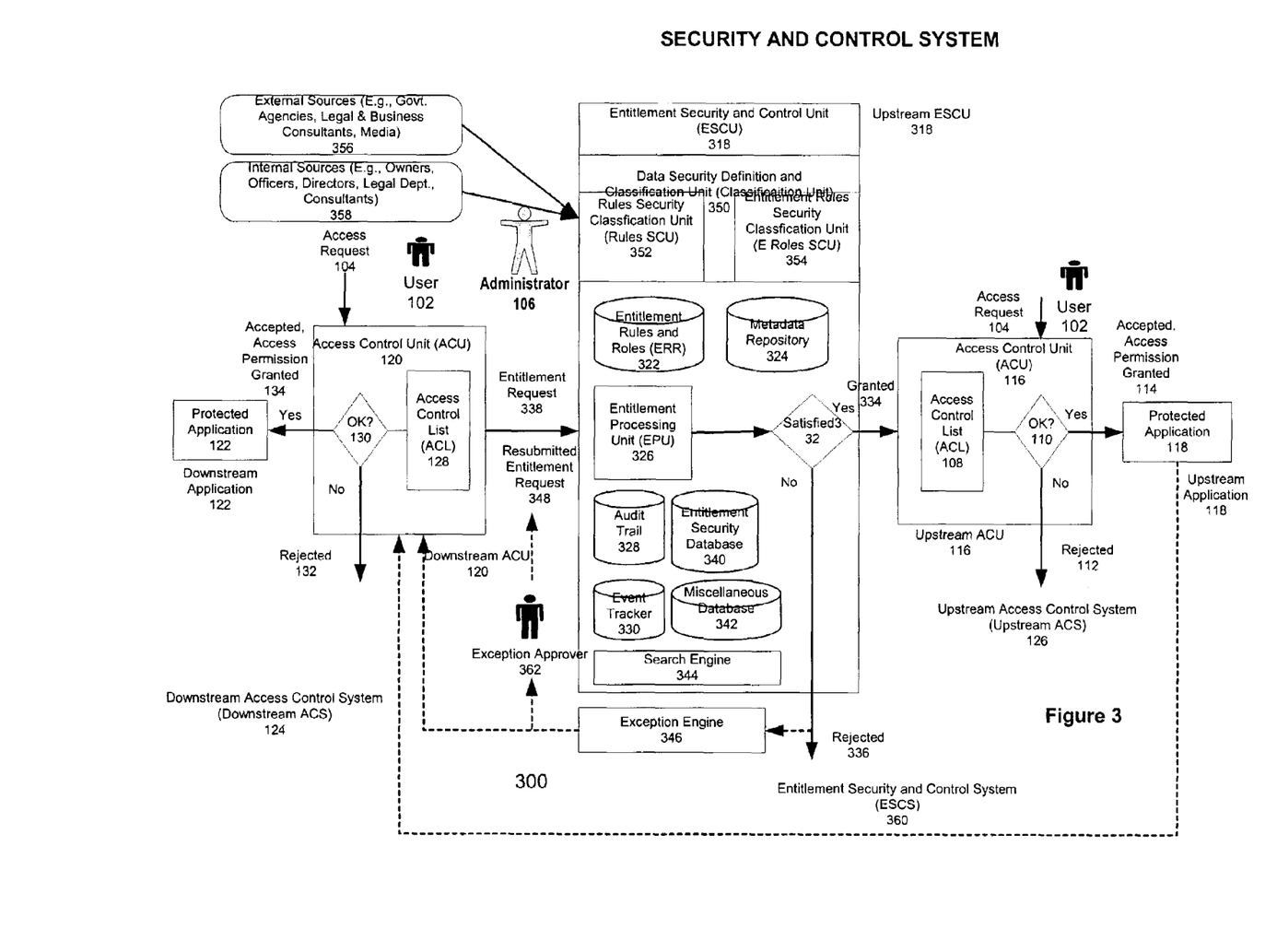
FIG. 3 is a block diagram conceptually illustrating an entitlement security and control system, according to one embodiment.

FIG. 3 is a block diagram conceptually illustrating a security and control system, according to one embodiment. As illustrated, according to one embodiment, the security and control system (SCS or system) 300 may comprise one or more access control systems (ACS) 124, 126, having access control units (ACU) 116, 120. The system 300 may further comprise an entitlement security and control system (ESCS) 360 having an entitlement security and control unit (ESCU) 318. According to one embodiment, the system 300 may comprise a downstream ACS 124 and an upstream ACS 126.

ACU 116, 120 typically relates to access control, i.e., processing of access requests 104 and granting 114, 134 and/or rejecting 112, 132 of such requests 104. Access relates to permitting a downstream ACS 124 to manipulate information as the holder of an access and role within an application, database, system, or such, or a combination thereof (protected application) 118, 122. Stated differently, permission to access is a process of enforcing that only the downstream ACS 124 with valid accounts or identification may see and/or manipulate the information held within a protected application 118, 122. According to one embodiment, ESCU 318 may be coupled with one or more of the many traditional access control system-based ACUs 116, 120, such as Access360, RAFC, Windows Active Directory, Discretionary Access Control (DAC), Mandatory Access Control (MAC), Role-Based Access Control (RBAC), which is no more than a pre-packed form of MAC, and Lattice-Based Access Control (LBAC), which is a combination of RBAC and DAC.

Typically, ACU 116, 120 may comprise an access control list (ACL) 108, 128 which may typically hold the names and other information of downstream ACS 124 and users 102, and have accounts and profiles. ACL 108, 128 may be kept locally or remotely, coupled with the ACU 116, 120. ACL 108, 128 may also have information regarding protected applications 122, 118 that a user 102 or a downstream ACS 124 would typically access. ACU 116, 120 and the ESCU 318 may be physically and/or logically integrated. For example, ACU and ESCU servers may be physically linked, or may be remotely coupled, or wireless linked, or there may be a combination thereof.

According to one embodiment, a downstream ACS 124 seeks entitlement permission to ultimately gain access to the upstream application 118. According to one embodiment, the upstream application 118 may be accessed at the upstream ACS 126 level, or according to another embodiment, contents of the upstream application 118 may be transmitted, physically and/or logically, to the downstream ACU 120 to be access at the downstream ACS 124 level. According to another embodiment, the downstream ASC 124 may be seeking entitlement permission as a user 102, on behalf of a user 102, a group of users 102, or all users 102 associated with the downstream ASC 124. Stated differently, in terms of seeking entitlement permission and access to the upstream application 118, the user 102 and the downstream ACS 124 may be regarded synonymous. According to one embodiment, the downstream SCS 346 and upstream SCS 344 may be part of or associated with the same SCS 300 or two or more different security and control systems.

According to one embodiment, a user 102 may be of any form of user desired for a particular implementation, and it is to be interpreted broadly. For example, a user 102 may be an individual, an employee, a client, a customer, a contractor, or such or a combination thereof. A user may also be a community or group of users, rather than an individual, based on their qualifications, projects, user and entitlement roles, geographic locations, or such, or a combination thereof.

As illustrated, the ESCU 318 may comprise one or more of the following: entitlement rules and roles (ERR) 322, metadata repository 324, entitlement processing unit (EPU) 326, audit trail 328, event tracker 330, entitlement security database (ESD) 340, miscellaneous databases, search engine 344 and exception engine 346. According to one embodiment, ERR 322 are to make ESCU 318 policy and law-sensitive, by having rules, regulations, and policies of all sorts and levels. For example, ERR 322 may comprise government laws, company rules, and community-based policies regarding privacy, labor, corporate governance, etc. According to one embodiment, ERR 322 are continuously received from various sources and updated to provide a real-time and content-sensitive entitlement security and control process.

According to one embodiment, ESCS 318 may acquire data, such as ERR 322 through a data security definition and classification process (classification process). ESCS 318 may be coupled or integrated, physically and/or logically, with the classification unit 350. According to one embodiment, classification unit 350 may comprise rules security classification unit (Rules SCU) 352 for security classification of data or data element comprising rules, and an entitlement roles security classification unit (E Roles SCU) 354 for security classification of the entitlement roles.

According to one embodiment, classification process refers to receiving sensitive data, including government and organization rules, regulations, laws, policies, and other relevant data from various sources and classifying of such data for ultimately generating entitlement rules and roles (ERR) 322. Entitlement roles, according to one embodiment, refer to a roll-up of data elements into a coherent report, screen, spreadsheet, budget, shipping record, view, etc. An entitlement role may be a subset of a database or user rights, and may be made up of data elements from multiple databases after a mathematical transformation, such as a report or a result of a query. As such, an entitlement role is different from a user role, which typically refers to a person's job classification or title, such as salesperson, buyer, accountant, etc. An entitlement role may be a report, a view, or a group of web pages entitled to several individuals meeting a specific criteria and may be irrelevant of user roles or job classifications. ERR 322 may be used to generate general entitlement requirements or criteria and specific entitlement requirements or criteria corresponding to each of the users 102 associated with the downstream ACS 124 requesting entitlement permission. Stated differently, according to one embodiment, the downstream ACS 124 passes data relating to each of the users to the ESCU 118, or according to another embodiment, the ESCU 118 may entirely rely on data retrieved from the metadata repository 324.

According to one embodiment, various sources internal sources 358 and external sources 356. Some of the internal sources 358 may include organization owners, shareholders, directors, department managers, legal department, internal business consultants, internal media and publications, etc. Some of the external sources 356 may include external business and legal counselors, federal, state, and local government and law enforcement agencies, news media and publications, legal media and publications, business media and publications, etc., or a combination thereof. Data from such sources may be consistently received and updated for providing a real-time, secure, content-aware, and accurate processing of entitlement requests. Classification process, according to one embodiment, refers, generally, to a process for generating data security classification of each of the data elements that makes up ERR 322 and for further determining whether aggregate of the data elements in entitlement roles have additive security sensitivity. Stated differently, classification process refers to a process for associating or appending entitlement role security classifications and sensitivities with all appropriate policies and regulations, capturing the entitlement requirements and ERR 322 of the data stewards, and enforcing their compliance before an entitlement account can be generated. Security classification of entitlement roles and rules may be collectively referred to as ERR 322. Stated differently, ERR 322 comprises security-classified entitlement rules, regulations, policies, and security-classified entitlement roles, or a combination thereof.

According to one embodiment, security classification of the data or data elements comprising rules may be based on various factors, such as data characteristics, data relevance and/or sensitivity, data confidentiality, etc. Depending on their content, various data elements may have different security classifications. For example, some information may be available to any downstream ACS 124 having access permission, while other information may be highly restricted and viewable only to a certain group of individuals and/or access control systems 124. Security classification of data and data elements may be determined in a number of ways, and sometimes these requirements may be additive and may apply simultaneously. Data typically refers to the quantitative value of information. For example, in a spreadsheet containing employee ages, the column having the numbers representing years would be classified as the data. According to one embodiment, data may refer to a rule or a set of rules received from one or more internal and/or external sources. The top cell with definition may be classified as data definition. According to one embodiment, data element refers to information element in its entirety. For example, in a spreadsheet, a data element would be the equivalent of a single column of information. There may, however, be a multiple instantiations of a value, but each instantiation would reflect the same definition. Data elements may include data values and data definitions. Security classification of data or data elements may refer to classifying data and data elements as entitlement rules as they may ultimately be used for allowing real-time, secure, content-aware, security-aware, automated, and accurate processing of entitlement requests.

According to one embodiment, security classification may relate to confidentiality of data element as determined by government rules and/or organization rules and policies. If confidential, the type of confidentially may be determined, such as top secret, secret, restricted secret, or confidential, by determining and defining the primary content of the data as compared with the rest of the data, rules and policies. Similarly, policy sensitivity of data may be determined, such as controlled country, private, or insider. An appropriate action may be determined and taken. According to one embodiment, confidentiality of aggregate data or information may be determined as it may relate to a downstream access control system 124.

According to one embodiment, security classification of entitlement roles may be based on the entitlement rules and possibly, but not necessarily other factors, such as entitlement requests, profiles, criteria, or a combination thereof. According to one embodiment, entitlement roles may be mutually exclusive for policy or other reasons. For example, the mutual exclusivity of an entitlement role that relates to and is limited to writing checks using a checking account and an entitlement role that related to and is limited to auditing or reconciling of the checking account. Some of these situations may simply be defined by accepted accounting principles. According to one embodiment, an entitlement role refers to an aggregate of data elements that comprise a single view or account permission matrix in a protected application 1118, 122. For example, the entitlement role of an administrator, such as 106 or data expert, would be to see and manipulate data elements in a protected application 118, 122. Other downstream ACS, such as 102, 124, however, may have entitlement roles with relatively reduced abilities. The nature or characteristics or an entitlement role may depend on the work-related status and personal status of the users 102, downstream ACS 124, and rules and policies. Work-related status may include position within the organization, geographic region, employment status, grade, workgroup, etc., or a combination thereof. Personal status may include age, credit rating, experience, education, etc., or a combination thereof. Security classification of entitlement roles may refer to classification of general entitlement roles and, if desired, specific entitlement roles corresponding to each of the user 102 and/or downstream ACS 124 for allowing a real-time, content-aware security-aware, automated, and accurate entitlement processing.

According to one embodiment, classification unit 350 may be coupled with a metadata repository 324 for capturing and classifying data. Stated differently, metadata is tagged to the data comprising ERR 322, and metadata repository 324 not only may have the actual data, but also data description, attributes, and security classification associated or appended with the data. According to one embodiment, having data, description, attributes, security classification in a metadata repository 324 may provide valuable information to the authorized individuals, such as administrators 106, developers, data experts, data approvers, and such, or a combination thereof, regarding for example, sensitivity, security, content, and value of the data, so that a better protection may be implement and enforced. Having a metadata repository 324 may provide for having a description of the data element security sensitivity and the collective role object sensitivity and related rules as placed in the metadata repository 324 allowing a developer to seek and to use the data with the advantage of being aware of its security descriptions and entitlement requirements. Stated differently, having a metadata repository 324 allows data security classifications and policy sensitivity to be referenced by the authorized individuals when, for example, manually approving an exception According to one embodiment, the ERR 322, the entitlement accounts and profiles, and the access accounts and profiles may be placed in a metadata repository 324. By tagging metadata, the ERR 322 and profiles are tokenized into objects, and each object calls up a specific routine to review certain changes. ERR 322 and profiles are kept updated with every change. Metadata being data about data, according to one embodiment, provides information about the data, it improves the quality of the data, it defines fields, names, and attribute parameter, etc. According to one embodiment, metadata repository 324 may be a database or system to capture information surrounding data elements. Metadata may include the source of data, update intervals, security classifications, policy and regulatory sensitivities, data retention requirements, etc.

According to one embodiment, reference databases in addition to metadata repository 324 may be provided. For example, audit trail 328, event tracker 330, other miscellaneous databases 342, such as Human Resources (HR) database, training database may be provided for additional references, placement, storage, logging, or a combination thereof, depending on circumstances, needs, requirements, system capabilities, or a combination thereof. Furthermore, according to one embodiment, a search engine 344 may be provided to help provide real-time searching capabilities. For example, a search engine 344 may search for data regarding downstream ACS 124 and/or users 102 associated with the downstream ACS 124 by retrieving the data from downstream ACL 128 or upstream ACL 108 or even from other internal and external sources in real-time. Search engine 344 may be designed or implemented to provide customized details and formats. Search engine 344, and other databases 350, 322, 324, 328, 330, 340, and 342 may be logically and/or physically coupled with one another in any combination, and may be logically and/or physically coupled with and/or within the system 300 or any other system or may be spread over two or more systems of various kinds.

According to one embodiment, EPU 326 performs the process of evaluating entitlement requests 338 received from the downstream ACU 120 within the downstream ACS 124 by comparing the information received as contained in the entitlement request 338 with the ERR 322. Stated differently, factors such as, characteristics and needs of users 102 associated with the downstream ACS 124 and of the downstream ACS 124 itself, are compared with ERR 322. Entitlement profile and/or account may be generated and stored for future reference, such as for audit or forensic review.

According to one embodiment, the entitlement and access accounts may refer to a particular sub-set of data in a system and may be linked to an entitlement or access role. According to one embodiment, accounts and profiles may include user 102 and downstream ACS 124 information (e.g., characteristics, attributes, billing information, position with the organization, address), information indicating types, nature, and characteristics of the protected application 118 to be accessed and characteristics of content, timing preference, i.e., preference of when to view or manipulate content, observational profile information based on automated observation and profile recordation of content consumption behavior.

According to one embodiment, content of the protected applications 118, 122 may be accessed in an electronically accessible format, existing as a computer file having a particular file format that is compatible, standard, or efficient for the type of content and will be stored in a memory.

According to one embodiment, audit trail 328 refers to a process for generating a report using the history of users 102 associated with and of the downstream ACS 124 requesting and receiving the entitlement permission. Audit trail 328 may also be used for auditing ACL 108, 128 to keep track of events. For example, an auditing may help identify users 102 and downstream ACS 124 encountering trouble in receiving access permission to the protected application 118 despite receiving entitlement permission or those 102, 124 whose access to the protected application 118 may have expired for one reason or another and entitlement permission need be discontinued.

According to one embodiment, audit trail 328 may be coupled with or comprise entitlement security database (ESD) 340. ESD 340 may be used for keeping placing and storing information regarding users 102 and downstream ACS 124 seeking, receiving, being denied entitlement permission and/or access permission at any point in time. Stated differently, ESD 340, along with audit trail 328, refers to a trusted reference database for, for example, placing, storing, and providing entitlement audit trail and information.

According to one embodiment, ESD 340 may be coupled with and/or communicate with ACL 108, 128 to provide entitlement audit trail and to keep and validate access-related information. For example, misplaced information may be verified and validated by referring and accessing ESD 340. As another example, ESD 340 may inform ACL 108, 128 to remove users 102 and downstream ACS 124 who may still have access, but who no longer have entitlement permission. For example, in case of termination of employment, an employee may continue to have access to her or his email despite having been terminated; however, having ESD 340 may help eliminate such possibility as ACL 108, 128 may instantly be informed of the termination. ESD 340 may not only help secure an organization from terminated employee accessing protected applications, but also may help protect against hackers, as hackers typically have access (as a result of hacking), but do not have entitlement permission. ESD 340 may allow the system 300 to be more security-aware, up-to-date, accurate, and fast when needing information.

According to one embodiment, event tracker 330 refers to watching over all or some of the trusted data sources and reviewing of entitlement requests 338 and permissions upon changes in rules, regulations, or characteristics. Event tracker 330 may watch and review for changes in all of the data and data sources. According to one embodiment, event tracker 330 may be provided to help perform a real-time check of various system databases 342, such as Human Resources (HR) database, training database, digital certificate, prior to, during, and after the entitlement process is completed, and tracking continuous update and changes. For example, the event tracker 330 may track for changes in the attributes surrounding the user's 102 status, such as a change in the salary in the HR database, then track the change, while the audit trail 328 may show that change as an event occurring and/or occurred. Depending on the characteristics of the event, circumstances, capabilities of the system 300, and such, an event may trigger ESCS 360 to signal the appropriate access control system (ACS) 126, 124 to delete user account or suspend it until further notice.

According to one embodiment, an exception engine 346 may be provided for the downstream ACS 124 to resubmit an entitlement request 348 if the first one 338 was rejected. However, those 124 who do not qualify for the exception process may stay rejected permanently for a certain period of time. However, the downstream ACS 124 qualifying for the exception process or option may be informed of the exception opportunity allowing the downstream ACS 124 to resubmit the entitlement request 348 along with additional information that may help obtain entitlement permission this time around. According to one embodiment, the inclusion of additional information may be optional or mandatory, or partially optional and mandatory, depending on various factors, such as type of system or database or application, type of user, type of organization, time, geography, or a combination thereof. According to one embodiment, for maximum security, a system or organization may require a 100% satisfaction of entitlement requirements. In contrast, a system or organization may require a lesser standard of satisfaction; nevertheless, according to one embodiment, provide users the exception option to resubmit entitlement requests. The resubmitted entitlement request 348 is reconsidered and reprocessed by the ESCU 318. According to another embodiment, an exception approver 362, such as an expert of the security and control system 300, may have the authority to approve or disapprove the exception.

According to one embodiment, the exception approver 362 may be the one who understands and is an expert in data security requirements. Furthermore, the system 300 in general, or the ESCU 318 in particular, may comprise a list of exception approvers 362, and in case of a change in the status of an exception approver 362, the event tracker 330 may inform the supervisor of the exception approver 362 to find a replacement or such. Maintenance of role management allows for scalability that improves even an un-automated access control system. According to one embodiment, the exception process may be limited to a certain number of times or be perpetual, depending on several factors, such as system administration, system capabilities, the downstream ACS 124, users 102, protected application 118, 122, and/or other relevant factors.

According to one embodiment, conventional technologies may be used, together with any desirable modifications that will be apparent to those skilled in the art. For example, the system 300 may comprise a conventional processor or machine to execute instructions, a conventional memory to store data, conventional encoder to encode data, a conventional transmitter to transmit data, a conventional receiver to receive data, and a conventional decoder to decode data. Without limitation, data may be converted uncompressed to compressed format, and transmitted over air. For example, the entitlement-related data may be transmitted or transferred from the ESCU 318 to the upstream ACU 116 or even to the downstream ACU 128, if needed.

Figure 4:
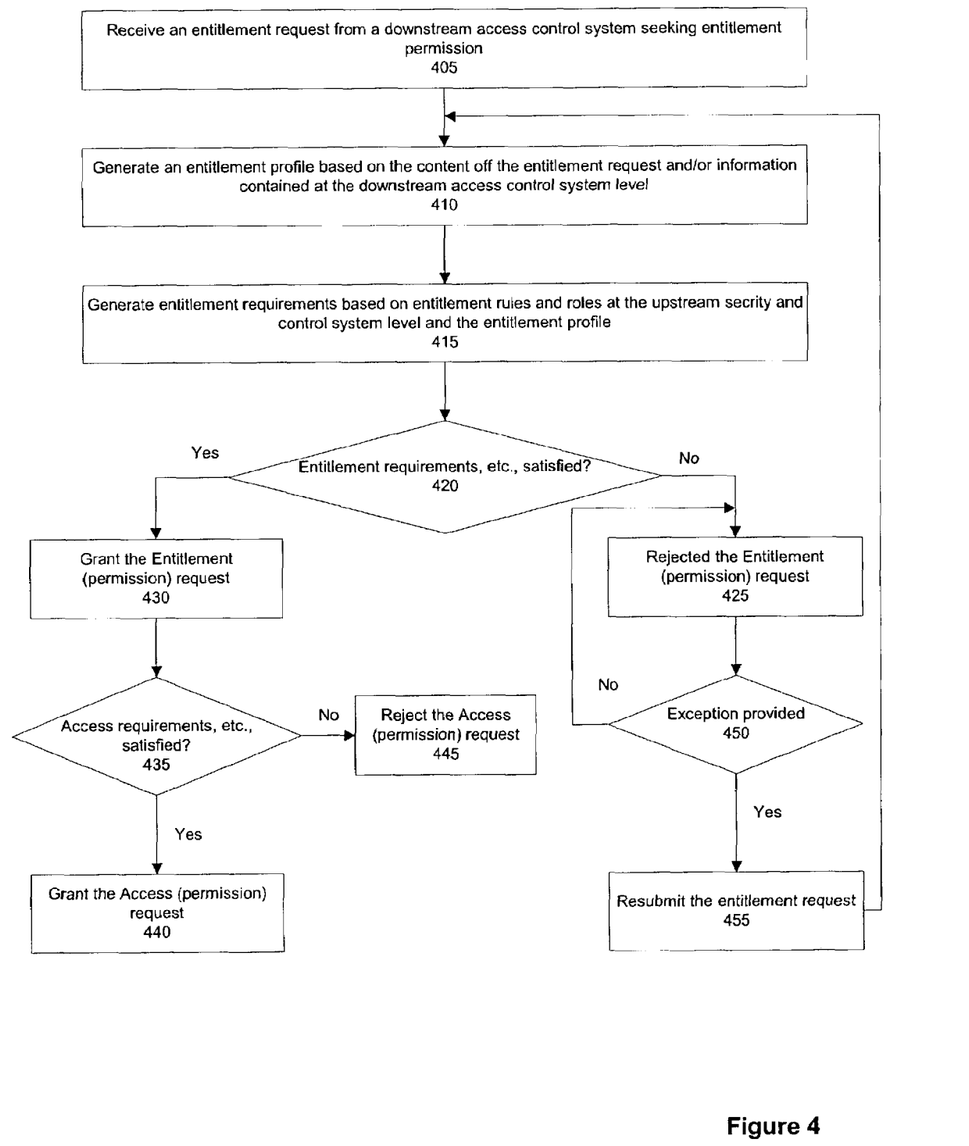
FIG. 4 is a flow diagram conceptually illustrating an entitlement permission process, according to one embodiment.

FIG. 4 is a flow diagram conceptually illustrating a security and control process, according to one embodiment. First, an entitlement request is received from a downstream access control system (downstream ACS) at processing block 405. The entitlement request may have been received from the downstream access control unit (downstream ACU) of the downstream ACS. According to one embodiment, security classification of data and placing of the data in a metadata repository may occur prior to any submitting and receiving of the entitlement request. According to one embodiment, the entitlement request may be for one user, a group of users, or all users associated with the downstream ACS, or, according to another embodiment, the entitlement request may be for the downstream ACS as a whole or for itself. According to one embodiment, an entitlement profile may be generated corresponding to each of the users or the downstream ACS based on the content the entitlement request and/or the information contained at the downstream access control level at processing block 410.

According to one embodiment, the information contained at the downstream level might be that all new data is considered, by default, to be one role, and the downstream ACS having user roles may modify the roles based on the new data. Updating the aggregate security classification of the expanded or new user roles at the downstream ACS may satisfy the security requirements of the upstream owners, i.e., the data may receive the same protection. On the other hand, if the downstream ACS does not use this entitlement system, the information of how the source data is to be used may be considered manually on an exception basis by an authorized person. The authorized person may know the data classifications of the source data as it may be retrieved from the metadata repository. Also, while manual, the existence of the metadata classification may enhance the process and allow the authorized person to make a security-sensitive and accurate decision.

Entitlement requirements or criteria may be generated based on the entitlement profile, and based on the entitlement rules and roles (ERR) as provided by the upstream entitlement security and control system (upstream ESCS) with the upstream security and control system (upstream SCS) at processing block 415. According to one embodiment, entitlement requirements may contain general requirements that are required for every user and/or downstream ACS and/or specific requirements specific to a user and/or downstream ACS whose entitlement request is being processed. According to one embodiment, neither entitlement profiles nor entitlement requirements or criteria may be needed, and instead, the entitlement request may be matched directly against ERR to determine whether the entitlement request be granted. According to one embodiment, a full satisfaction of the entitlement requirements may be required, reflecting maximum security; however, an organization may chose to relax such requirement and, instead, require a lesser level of satisfaction. ERR, entitlement profiles, and entitlement requirements may be dynamically updated.

Whether entitlement permission should be granted is determined at decision block 420. If the match is not satisfied, the downstream ACS is rejected at processing block 425. Stated differently, the downstream ACS may not go on to the next step of requesting access permission, unless an exception is provided at decision block 450. If an exception option if provided, the downstream ACS may resubmit the entitlement request for reconsideration and reprocessing at processing block 455. If the match is satisfied, i.e., the entitlement requirement are met, the entitlement permission request is granted at processing block 430, and the downstream ACS may qualify or is permitted to go on to the next step, which is to request access to an upstream application at the upstream ACS or downstream ACS. According to another embodiment, an exception approver, such as an expert of the security and control system, may have the authority to approve or disapprove the exception. The entitlement-related information may be securely transmitted from the upstream ESCS to the appropriate upstream ACS.

Upstream ACS of the upstream SCS may determine whether access to the upstream application be granted to the downstream ACS at decision block 435. If access requirements are satisfied, access to the upstream application is provided at processing block 440. The frequency of accessing may depend on various factors, such as downstream ACS and user needs, qualifications, roles, overall system capabilities, etc. Access permission request is rejected when access requirements or criteria are not met at processing block 445.

Figure 5:
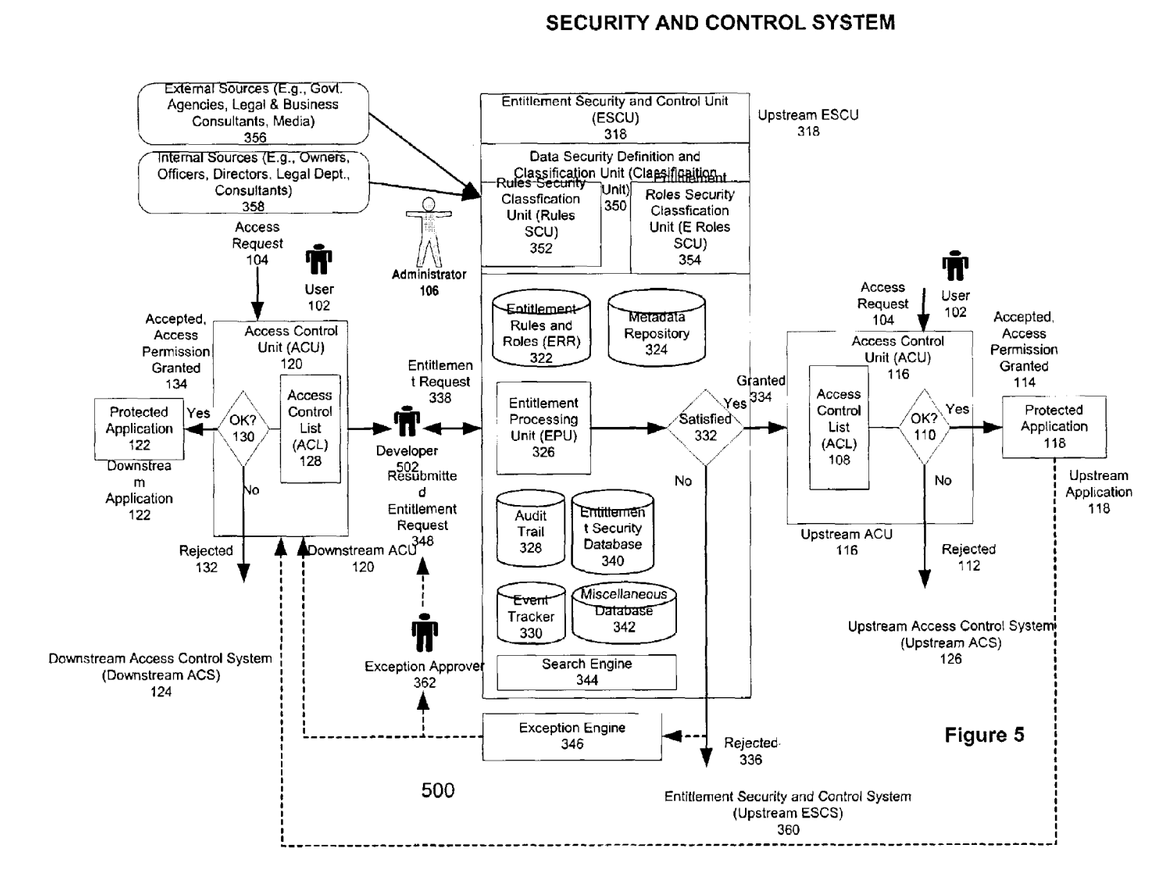
FIG. 5 is a block diagram conceptually illustrating an entitlement security and control system, according to one embodiment.

FIG. 5 is a block diagram conceptually illustrating a security and control system, according to one embodiment. As illustrated, a developer 502 may be given the authority to entirely or partially receive and process the entitlement requests 338. According to one embodiment, the developer may be authorized to retrieve data from various databases, such as (entitlement rules and roles) ERR 322, metadata repository 324, audit trail 328, entitlement security database 340, event tracker 330, and other miscellaneous databases 342, and such, of the entitlement security and control unit (ESCU) 318 of the entitlement security and control system 360, and the upstream access control list (upstream ACL) 108 of the upstream access control unit (upstream ACU) 116 of the upstream access control system (upstream ACS) 126 of the security and control system (system or SCS) 500. Additionally, the developer 362 may be authorized to retrieve data from various databases, sources, and components of the downstream ASC 124, such as from the downstream ACL 128 of the downstream ACU 120. The developer 502 may be authorized to retrieve data from various external and internal sources and databases as well to use the search engine 344 to access some or all of such external and internal sources. According to one embodiment, the upstream application 118 may be accessed at the upstream ACS 126, or according to another embodiment, contents of the upstream application 118 may be transmitted, physically and/or logically, to the downstream ACU 120 to be access at the downstream ACS 124 level.

According to one embodiment, and as with regard to FIG. 3, the developer 502 may process entitlement requests 338 not only using predefined and pre-decided entitlement and access roles, but also using non-defined and even previously non-identified roles to process entitlement requests 338 in real-time with data and content-sensitivity and awareness. Furthermore, the developer 502 may use a specifically designed application to perform the process to keep the process not only automated, but also to keep it accurate and fast. In other words, a developer's 502 authority, access, reach, responsibilities, and performance may be different from the authority, access, reach, responsibilities, and performance of a typical administrator 106.

According to one embodiment, a typical administrator 106 may be an external security person or group, or someone within the organization, or a combination thereof 338. Typically, an administrator 106 is a trusted individual, a specialist, or a data approver, to some level. A developer 502, on the other hand, may be authorized and qualified to perform various functions that the administrator 106 may not be authorized or qualified to perform. For example, the developer 502 may have access to certain databases, sources, components, and functions of the system 500 that an administrator 106 might not. A developer 502 may be authorized to create, update, and/or delete an application as needed or desired. According to one embodiment, an authorized individual may consistently review the defined metadata tags to stay updated with the type, classification, and nature of data in use and may review such information against changing organizational policies and governmental rules to, for example, keep the data updated. According to one embodiment, titles, such as administrator 106, developer 502, data approver, exception approver 560, and authorized person, under certain circumstances, may be used interchangeably, as one individual may have all the responsibilities, or they may all be completely entirely different individuals with separate responsibilities.

Figure 6:
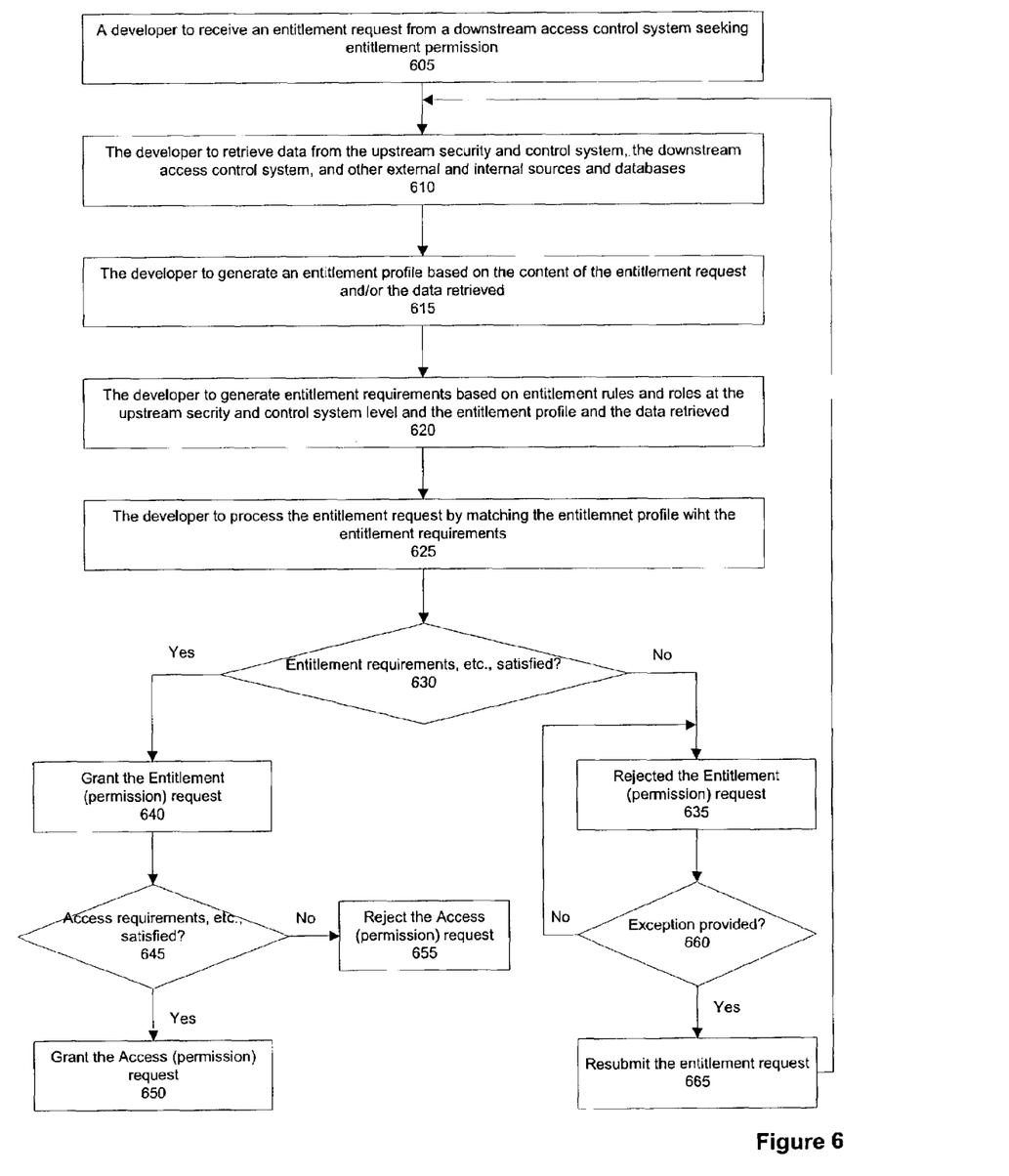
FIG. 6 is a flow diagram conceptually illustrating an entitlement permission process, according to one embodiment.

FIG. 6 is a flow diagram conceptually illustrating a security and control process, according to one embodiment. Entitlement request is received by an authorized individual, such as a developer, within a security and control system (SCS or system) from a downstream access control system (downstream ACS) seeking entitlement permission to ultimately gain access to an upstream protected application at processing block 605. The downstream ACS here may be representing a user, a set of users, all users associated with the downstream ACS, the downstream ACS as a whole or itself may be treated as a user seeking entitlement permission. The users associated with the downstream ACS may already have access to one or more downstream applications. According to one embodiment, the developer is authorized to and may retrieve information needed to process the entitlement request from various databases and sources within the upstream security and control system (upstream SCS) and the downstream ACS and other external and internal sources coupled with the upstream and downstream systems and/or independent of the two systems at processing block 610.

According to one embodiment, the developer generates an entitlement profile using the information contained in the entitlement request at processing block 615. The developer may also generate entitlement requirements or criteria based on entitlement rules and roles (ERR) at the upstream SCS, access-related information both at the upstream SCS and the downstream ACS, information contained in the entitlement request, and other information retrieved by the developer from various sources at processing block 620. According to one embodiment, the developer processes the entitlement request in real-time by reviewing the entitlement profile against the entitlement requirements at processing block 625. However, it is to be noted that, according to another embodiment, the developer may choose not to generate entitlement profiles and/or entitlement requirements and simply process the entitlement request by directly matching it against the ERR. According to one embodiment, the system may review the entitlement request using the information contained in the metadata repository without revealing any of the information to the developer, until, may be when the entitlement process results in an entitlement permission and/or access.

At decision block 630, it is determined whether entitlement permission be granted. If granted, the downstream ACS is allowed to seek access permission to access one or more upstream protected applications at processing block 640. On the other hand, if rejected at processing block 635, the downstream ACS may have an exception option to resubmit the entitlement request. At decision block 660, it is determined whether an exception option be granted. If granted, the downstream ACS may resubmit the entitlement request at processing block 665; however, if the exception option is not provided, the downstream ACS is rejected at processing block 635. The frequency of the exception process may depend on entitlement profiles, ERR, organization, upstream and downstream system capabilities, etc., or a combination thereof. According to another embodiment, the downstream ACS may be permanently rejected or rejected for a predefined period of time depending on factors, such as entitlement profile, ERR, organization, system capabilities, etc., or a combination thereof.

At decision block 645, it is determined whether the downstream ACS is granted access to the upstream application, assuming the downstream ACS submitted an access permission request. If approved, the downstream ACS may be allowed to access the upstream application at processing block 650. If rejected again, the downstream ACS may not access the upstream application at processing block 655. It is conceivable that the security and control system as a whole or the upstream ACS may have an exception option or process similar to the one granted by the entitlement SCS. Furthermore, access may be granted to a user, a group of users, or all users associated with the downstream ACS or the downstream ACS as a whole and itself.

Figure 7:
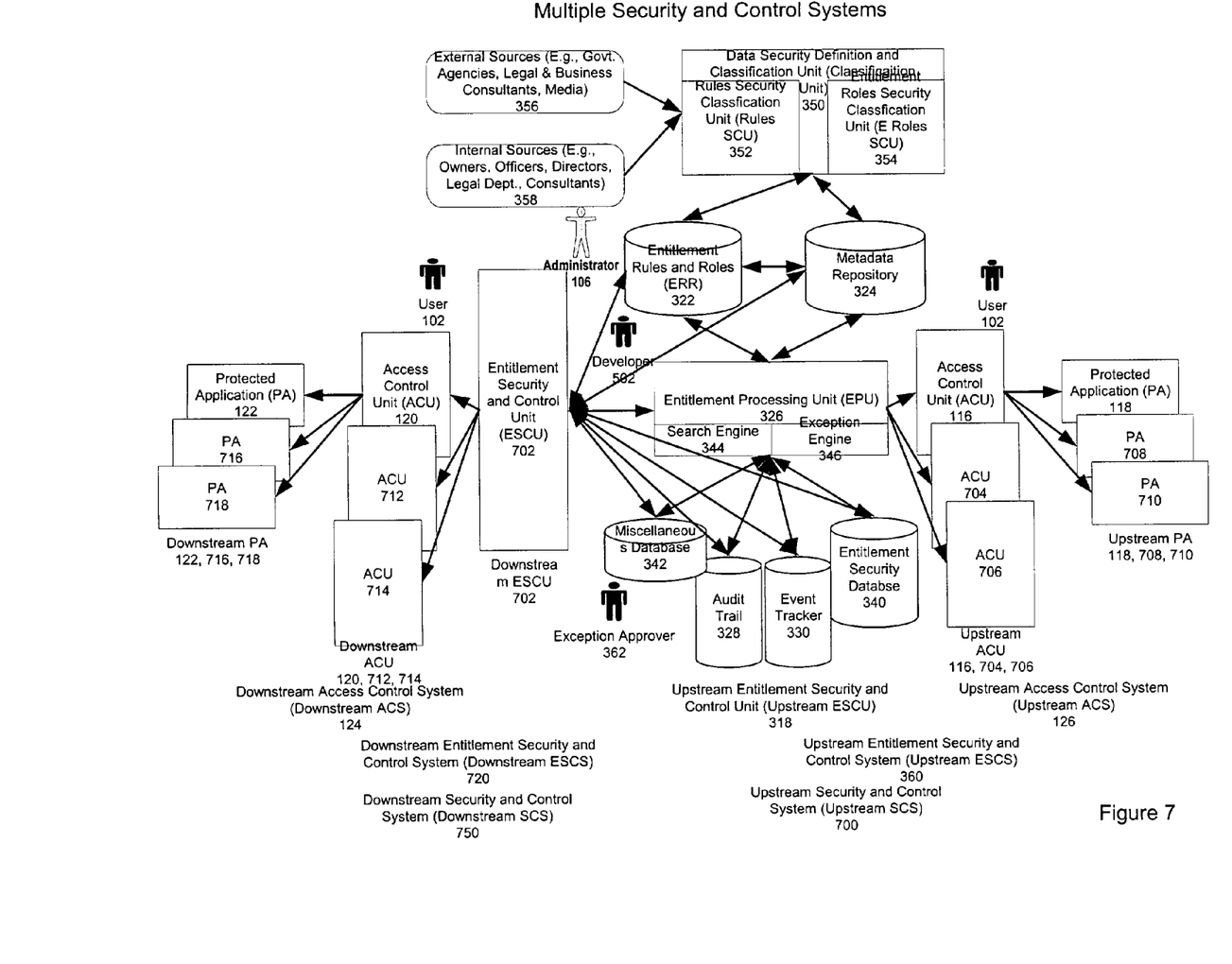
FIG. 7 is a block diagram conceptually illustrating multiple entitlement security and control systems, according to one embodiment.

FIG. 7 is a block diagram conceptually illustrating multiple security and control systems, according to one embodiment. As illustrated, the flow of data with regard to entitlement and access may not be limited to within only one security and control system (SCS or system), but it may be between multiple security and control systems 700, 750, each having an entitlement security and control system (ESCU) 360, 720. According to one embodiment, the downstream SCS 750 may comprise a downstream ESCS 720 having a downstream entitlement security and control unit (downstream ESCU) 720 and a downstream access control system (downstream ACS) 124 having one or more downstream access control units (downstream ACU) 120, 712, 714. Similarly, the upstream SCS 700 may comprise an upstream ESCS 360 having an upstream entitlement security and control unit (upstream ESCU) 318 and a downstream access control system (downstream ACS) 126 having one or more downstream access control units (upstream ACU) 116, 704, 706.

According to one embodiment, a user 102 or a group of users 102 or all users 102 associated with the downstream ACS 124 or the downstream ACS 124 as a whole may have access to one or more downstream protected applications (downstream application) 122, 716, 718 and may gain access to one or more upstream protected applications (upstream application) 118, 708, 710. According to one embodiment, the entitlement process between the downstream system 750 and the upstream system 700 may be direct, as described with regard to FIGS. 3 and 4, or through an authorized individual, such as a developer 502, as described with regard to FIGS. 5 and 6. The developer 502 may be associated with the downstream system 750 or the upstream system 700 or both 700, 750 or neither and be neutral.

According to one embodiment, the downstream and upstream ESCS 720, 360 may comprise, have access to, or be coupled with, physically and/or logically, to various components in the same location or remotely. Such components may comprise: data security definition and classification unit (classification unit) 350 to receive information from external 356 and/or internal sources 358. The classification unit 350 may be coupled with the entitlement rules and roles (ERR) database 322 and metadata repository 324. Both the ERR 322 and metadata repository 324 may be coupled with the downstream and upstream EPU 702, 326 and directly or indirectly, physically and/or logically, coupled with other components, such as entitlement security database (ESD) 340, event tracker 330, audit trail 328, search engine 344, exception engine 346, and other miscellaneous databases 342. According to one embodiment, the sharing of the components by the multiple ESCS 720, 360 may provide additional security benefit by having centralized database security reference and storage units.

According to one embodiment, the integration as described above, may involve servers, applications, systems, databases, and various other apparatus and/or software, as desired. For example, any of the ACUs 116, 704, 706, 120, 712, 714 may reside remotely from the ESCUs 720, 360, and may be linked wireless or coupled in some other way. Systems may serve and/or have multiple platforms, such as VAX, Mainframe, PC, Active Directory, Novell, MAC, UNIX, LINUX, etc., as well as standalone machines. According to one embodiment, an ACU may be required to serve different access control systems and users, same ACS and users, or a combination thereof. Some to the ACUs 116, 704, 706, 120, 712, 714 may be acquired to serve as floaters when one or more of the ACUs 116, 704, 706, 120, 712, 714 fail to perform.

According to one embodiment, any combination of the various components of the SCS 700, 750 is contemplated, and may be used based on a given circumstances and/or predetermined criteria. It is also contemplated that not all the components are necessary, and several other components may be added, as it will be obvious to the one familiar with the art. For example, various components and units, such as audit trail 328 and event tracker 330 may completely be eliminated.

What is claimed is:

1. A method comprising:
    receiving an entitlement request from a downstream access control system seeking an entitlement permission;
    searching data relating to the downstream access control system and to a user associated with the request to provide details of the data in a customized format, wherein the searching of the data is performed in real-time via a search engine, retrieving the data, and matching the data with request information contained in the request;
    retrieving entitlement rules and roles from a metadata repository, the metadata repository includes metadata describing the entitlement rules and roles;
    matching the request information with the entitlement rules and roles and the metadata;
    granting the entitlement permission upon satisfaction of the entitlement rules and roles by the entitlement request;
    generating an audit trail of entitlement events by keeping track of the entitlement events relating to the granting of the entitlement permission, the audit trail having entitlement-related information, the tracking of the entitlement events including identifying missing information, the missing information is verified against the entitlement-related information being stored at a database, wherein the audit trail is further to perform one or more of track history of the user, identify the user, track updates to status of the user, and validate access-related information;
    tracking and maintaining data sources in real-time via an event tracker, wherein the data sources include the database;
    validating the granting of the entitlement request by accessing the audit trail;
    rejecting the entitlement permission upon dissatisfaction of the entitlement rules and roles by the entitlement request; and
    granting an exception to the downstream access control system, the exception comprises the downstream access control system submitting a second entitlement request to seek entitlement permission.

2. The method of claim 1, further comprising:
    generating an entitlement profile based on the entitlement request;
    generating entitlement requirements based on the entitlement rules and roles;
    matching the entitlement profile against the entitlement requirements; and
    granting the entitlement permission upon satisfaction of the entitlement requirements by the entitlement profile.

3. The method of claim 1, further comprising:
    tagging the metadata with the entitlement rules and roles; and
    placing the entitlement rules and roles in the metadata repository.

4. The method of claim 2, further comprising:
    tagging the metadata with the entitlement profile and the entitlement requirements; and
    placing the entitlement profile and the entitlement requirements in the metadata repository.

5. The method of claim 1, wherein the entitlement rules and roles comprise security classified entitlement rules and security classified entitlement roles.

6. The method of claim 5, wherein the security classified rules comprise one or more of laws, rules, regulations, policies, plans, and considerations.

7. The method of claim 1, wherein the entitlement permission comprises the downstream access control system to qualify to seek an access permission.

8. The method of claim 7, wherein the access permission comprises the downstream access control system to qualify to seek access to one or more of an upstream protected application, an upstream protected database, upstream protected system, and an upstream protected role.

9. The method of claim 2, wherein the entitlement profile comprises information based on the entitlement request and the entitlement rules and roles.

10. The method of claim 2, wherein the entitlement requirements comprise requirements based on the entitlement request and the entitlement rules and roles.

11. A system comprising:
    an entitlement security and control unit having:
        a data classification unit to receive and classify data to form entitlement rules and roles;
        a metadata repository coupled with the classification unit, the metadata repository having the entitlement rules and roles and metadata describing the entitlement rules and roles; and
    an entitlement processing unit coupled with the metadata repository, the entitlement processing unit to
        process an entitlement request received from a downstream access control system seeking an entitlement permission to an upstream protected application by searching data relating to the downstream access control system and to a user associated with the request to provide details of the data in a customized format, wherein the searching of the data is performed in real-time via a search engine,
    retrieve the data, and match the data with request information contained in the request, and match the request information with the entitlement rules and roles and the metadata,
    grant the entitlement permission upon satisfaction of the entitlement rules and roles by the entitlement request, generate an audit trail of entitlement events by keeping track of the entitlement events relating to the granting of the entitlement permission, the audit trail having entitlement-related information, the tracking of the entitlement events including identifying missing information, the missing information is verified against the entitlement-related information being stored at a database, validate the granting of the entitlement request by accessing the audit trail, wherein the audit trail is further to perform one or more of track history of the user, identify the user, track updates to status of the user, and validate access-related information, and track and maintain data sources in real-time via an event tracker, wherein the data sources include the database, reject the entitlement permission upon dissatisfaction of the entitlement rules and roles by the entitlement request, and granting an exception to the downstream access control system, the exception comprises the downstream access control system submitting a second entitlement request to seek entitlement permission.

12. The system of claim 11, wherein the entitlement processing unit is further to retrieve the entitlement rules and roles from the metadata repository.

13. The system of claim 11, wherein the entitlement processing unit comprises an event tracker to track events relating to processing of the entitlement request.

14. A tangible computer-readable storage medium comprising computer program which, when executed, cause a computer to:

receive an entitlement request from a downstream access control system seeking an entitlement permission;

search data relating to the downstream access control system and to a user associated with the request to provide details of the data in a customized format, wherein the searching of the data is performed in real-time via a search engine, retrieving the data, and matching the data with request information contained in the request;

retrieve entitlement rules and roles from a metadata repository, the metadata repository includes metadata describing the entitlement rules and roles;

match the request information with the entitlement rules and roles and the metadata;

grant the entitlement permission upon satisfaction of the entitlement rules and roles by the entitlement request;

generate an audit trail of entitlement events by keeping track of the entitlement events relating to the granting of the entitlement permission, the audit trail having entitlement-related information, the tracking of the entitlement events including identifying missing information, the missing information is verified against the entitlement-related information being stored at a database, wherein the audit trail is further to perform one or more of track history of the user, identify the user, track updates to status of the user, and validate access-related information;

track and maintain data sources in real-time via an event tracker, wherein the data sources include the database;

validate the granting of the entitlement request by accessing the audit trail;

reject the entitlement permission upon dissatisfaction of the entitlement rules and roles by the entitlement request; and grant an exception to the downstream access control system, the exception comprises the downstream access control system submitting a second entitlement request to seek entitlement permission.

15. The tangible computer-readable storage medium of claim 14, wherein the computer program when executed, further cause the computer to:

generate an entitlement profile based on the entitlement request;

generate entitlement requirements based on the entitlement rules and roles;

match the entitlement profile against the entitlement requirements; and grant the entitlement permission upon satisfaction of the entitlement requirements by the entitlement profile.

16. The tangible computer-readable storage medium of claim 14, wherein the computer program when executed, further cause the computer to:

tag the metadata with the entitlement rules and roles; and place the entitlement rules and roles in the metadata repository.

17. The tangible computer-readable storage medium of claim 15, wherein the computer program when executed, further cause the computer to:

tag the metadata with the entitlement profile and the entitlement requirements; and place the entitlement profile and the entitlement requirements in the metadata repository.

* * * * *